(12) United States Patent
Franck et al.

(10) Patent No.: US 6,676,093 B2
(45) Date of Patent: Jan. 13, 2004

(54) AT LEAST TWO-PART HOOK ADHESIVELY MOUNTED

(75) Inventors: Achim Franck, Hamburg (DE); Tobias Reiss-Schmidt, Hamburg (DE); Norbert Koop, Hamburg (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 10/075,494

(22) Filed: Feb. 13, 2002

(65) Prior Publication Data

US 2002/0121581 A1 Sep. 5, 2002

(30) Foreign Application Priority Data

Feb. 14, 2001 (DE) .......................... 101 07 422

(51) Int. Cl.[7] .......................... A47G 1/17; A47G 29/00; F16B 47/00
(52) U.S. Cl. .................. 248/205.3; 248/304; 428/343
(58) Field of Search .................. 248/205.3, 205.4, 248/304, 339, 216.1, 301, 690, 692, 617; D8/367, 373; 428/343

(56) References Cited

U.S. PATENT DOCUMENTS

| | | | | | |
|---|---|---|---|---|---|
| 4,795,294 A | * | 1/1989 | Takada | ....................... | 411/457 |
| 5,018,697 A | * | 5/1991 | Treanor | ....................... | 248/547 |
| 5,346,169 A | * | 9/1994 | Polonsky | ..................... | 248/547 |
| 5,433,413 A | * | 7/1995 | Adams | ....................... | 248/205.3 |
| 5,921,514 A | | 7/1999 | Schumann | ................... | 248/205 |
| 6,082,686 A | * | 7/2000 | Schumann | ................ | 248/205.3 |
| 6,106,937 A | * | 8/2000 | Hamerski | ................... | 428/343 |
| 6,126,372 A | * | 10/2000 | Takata | ........................ | 411/513 |
| 6,131,864 A | | 10/2000 | Schumann | ................ | 248/205.3 |
| 6,406,781 B1 | * | 6/2002 | Hamerski | ................ | 428/317.3 |

FOREIGN PATENT DOCUMENTS

| | | | |
|---|---|---|---|
| DE | 196 41 118 C1 | 10/1996 | .......... F16B/45/00 |
| DE | 197 35 228 A1 | 2/1999 | .......... F16B/11/00 |
| EP | 0 916 294 A1 | 5/1999 | .......... A47G/1/17 |
| WO | WO 94/21157 | 9/1994 | .......... A47G/1/17 |

* cited by examiner

*Primary Examiner*—Gwendolyn Baxter
(74) *Attorney, Agent, or Firm*—Norris McLaughlin & Marcus

(57) ABSTRACT

An at least two-part hook, which is composed of an adapter plate which, for adhesive bonding with a strip of a double-sided adhesive film whose bond can be broken by being pulled, is designed in such a way that a tab of the adhesive strip projects beyond the adapter plate, and a hook body which is located on the adapter plate and which is placed on the adapter plate, a cover, which covers at least some sections of the adapter plate, being plugged onto said adapter plate.

6 Claims, 10 Drawing Sheets

AT LEAST TWO-PART HOOK ADHESIVELY MOUNTED

The invention relates to an at least two-part hook, in particular a wall hook, which can be reversibly adhesively bonded by means of an adhesive strip whose bond can be broken by being pulled, and can be reused, if necessary with a new such adhesive strip.

BACKGROUND OF THE INVENTION

Adhesive strips whose bond can be broken by being pulled are on the market as "tesa Power Strips" from Beiersdorf AG and are also described by numerous patents, such as DE 33 31 016 B1, DE 42 22 849 B1, DE 43 39 604 B1, DE 44 28 587 B1 and DE 44 31 914 B1. In addition, however, U.S. Pat. No. 4,024,312, WO92/11332 A1, WO92/11333 A1 and WO95/06691 A1 describe adhesive strips of this type. Such adhesive strips are pulled out of the adhesive bond in the direction of the adhesive joint, in a similar way to opening a preserving jar.

For example, U.S. Pat. No. 4,024,312 describes a self-adhesive strip having an extensible and elastic carrier made of a block copolymer, in particular for applications in the medical area, where pain-free removal from the skin is desired.

In addition, DE 33 31 016 A1 describes an adhesive film for redetachable adhesive bonds, which permit an adhesive bond produced with it to be detached by pulling on the adhesive film in the direction of the bonding plane. Using such adhesive film, high adhesion forces and shear strengths can be achieved, and adhesive bonds can be detached again without further aids, comparable with the opening of a preserving jar, in a way similar to the way in which the rubber seal there is pulled out of the sealing joint by the tab.

Furthermore, DE 37 14 453 C1 describes a practice explosive body which can be removed again from practice objects non-destructively and which is reversibly fixed with such an adhesive film.

In addition, WO 92/11333 A1 describes, inter alia, adhesive films for corresponding applications, the adhesive films used exhibiting low elasticity and, at the same time, high expansion.

DE 42 22 849 C1 likewise describes a strip of an adhesive film of this type having a specially configured tab.

In addition, hooks or similar fixing systems for use together with such adhesive strips can be obtained on the market as "tesa Power Strips with hook" or else as "tesa Power Strips system hooks" from Beiersdorf AG.

Finally, DE 42 33 872 C2, DE 195 11 288 B1 and WO 94/21157 A1 describe redetachable self-adhesive hooks, which are likewise equipped with such adhesive films and are therefore redetachable.

For example, DE 196 41 118 C1 describes a redetachable, self-adhesive hook or fastening device of that sort having a base plate, defined by a strip of a double-sided adhesive film which is one such that the adhesive bond achieved with it can be detached again by means of pulling and stretching. On its front side, the film bears the base plate and, by the rear side, is adhesively bonded to a sub-base, separation of the adhesively bonded base plate of the fixing device, together with the strip, from the sub-base being carried out by rotating the base plate substantially in the plane of the bond.

DE 197 35 228 A1 discloses a hook comprising a one-part hook body and a one-part base plate, the base plate to be adhesively bonded with an adhesive strip whose bond can be broken by being pulled is designed in such a way that a tab of the adhesive strip projects beyond the base plate, the hook body being designed in such a way that it covers the base plate and also the tab projecting beyond the latter.

Present on the base plate is a molding in which at least one spring element is fixed and which has a protrusion in the collar area. Formed in the hook body are guides, in which the protrusion of the molding of the base plate is guided in such a way that

- the hook body and the base plate are nondetachably connected to each other,
- the hook body is detached by means of a movement parallel to the base plate from the basic position, in which the hook body is anchored to the base plate and, at the same time, covers the base plate and tab of the adhesive strip, and is displaced parallel to the base plate and
- the hook body can be rotated over the spring element by up to 90°, so that
- access to the tab is possible.

DE 197 35 229 A1 shows a hook comprising a one-part hook body and at least one one-part hinge element and a one-part base plate, the base plate for adhesive bonding with an adhesive strip whose bond can be broken by being pulled being designed in such a way that a tab of the adhesive strip projects beyond the base plate. The hinge element is designed in such a way that the tab located on the adhesive strip is covered. The hook body is designed in such a way that it covers the base plate and the hinge element, which are both arranged in one plane,

- the base plate and the hinge element being connected to each other via a hinge, in particular a film hinge,
- the hinge element and the hook body being connected to each other via a hinge, and
- it being possible for the hook body, on the side adjoining the hinge element, to be lifted up from the basic position, in which the hook body is anchored on the base plate and, at the same time, covers the base plate and hinge element of the adhesive strip, and to be displaced by means of a movement parallel to the base plate, so that access to the tab is possible.

DE 197 35 234 A1 discloses a hook comprising a one-part hook body and a one-part base plate, the base plate for adhesive bonding with an adhesive strip whose bond can be broken by being pulled being designed in such a way that a tab of the adhesive strip projects beyond the base plate, the hook body being designed in such a way that it covers the base plate and also the tab projecting beyond the latter. Integrally molded on the base plate are at least four widened portions, which are each located opposite one another in pairs and project laterally beyond the base plate. Formed in the hook body are guides in which the widened portions of the base plate are guided in such a way that

- the hook body is detached by a movement parallel to the base plate from the basic position, in which the hook body is anchored on the base plate and, at the same time, covers the base plate and tab of the adhesive strip, and in the process is lifted off the sub-base, at least on one side, so that
- access to the tab is possible,
- the hook body and the base plate are nondetachably connected to each other.

However, the adhesive systems and hooks presented in the aforementioned documents also have a number of disadvantages:

None of the known hooks is constructed in two or more parts, using a cover. If one wishes to change the visual impression of the respectively bonded hook, one is forced to replace this hook by another which has the desired form. It is always necessary to acquire the corresponding hook.

It is further disadvantageous that the hook to be replaced has to be removed from the wall and then the new hook has to be adhesively bonded again, a procedure which is felt to be burdensome and time-consuming.

Even during production, the conventional hooks are affected by drawbacks. For example, in the case of extremely small changes in the hook design, the entire tool had hitherto to be made again.

It is an object of the invention to provide a remedy here, in particular to provide a hook or the like which does not have the disadvantages of the prior art, or at least not to the same extent, and which in particular can be used as a wall hook.

SUMMARY OF THE INVENTION

The at least two-part hook according to the invention is composed of an adapter plate which, for adhesive bonding with a strip of a double-sided adhesive film whose bond can be broken by being pulled, is designed in such a way that a tab of the adhesive strip projects beyond the adapter plate, and a hook body which is located on the adapter plate and which is placed on the adapter plate. A cover, which covers at least some sections of the adapter plate, is plugged onto said adapter plate.

DETAILED DESCRIPTION

In a first advantageous embodiment of the at least two-part hook, the cover covers the entire adapter plate and/or the tab of the adhesive strip. Furthermore, it is particularly preferred if the cover projects over the adapter plate at all edges, so that of the adapter plate only the hook body can be seen when the cover is located above it.

Furthermore, on the cover there is preferably a second hook body, which preferably in particular supplements the hook body on the adapter plate to form a single hook. In this case, the two hook bodies can rest on one another with a form fit.

The adapter plate and/or the cover are further preferably produced from glass, metal or plastic, preferably polyethylene terephthalate, polystyrene or ABS. The thickness of the adapter plate and/or of the cover preferably lies between 0.8 and 2.2 mm, in particular between 1 and 2 mm, a value of 1.5 mm having proven to be particularly advantageous.

Then, the adapter plate and/or the cover are in particular transparent. In a further advantageous embodiment, the adapter plate and the cover are non-detachably connected to each other.

Finally, the hook can have an adhesive strip adhesively bonded behind the adapter plate.

The adhesive strip is preferably equipped so as to be self-adhesive on both sides.

It is further preferred for the adhesive strip to consist of a material which is highly extensible and deformable elastically or plastically under extension, if appropriate with an intermediate carrier, in particular with a film or foam intermediate carrier. The adhesion of the adhesive film should be lower than the cohesion, the adhesive capacity should disappear to a large extent when the film is extended, and the ratio of pull-off force to tearing load should be at least 1:1.5.

The adhesive strip is preferably one based on thermoplastic rubber and tackifying resins, with high elasticity and low plasticity.

The adhesive strips can be equipped to be pressure-sensitive adhesive on one side or both sides or else with a thermally activatable adhesive compound on one side or both sides. Their construction can be designed in one layer or multiple layers. In the case of double-sided pressure-sensitive adhesive self-adhesive tapes, elastically or plastically deformable materials can be used as the intermediate carrier. This includes, in addition to plastic films, in particular adhesive compounds as intermediate layers and foam-containing intermediate carriers. In a preferred embodiment, the adhesive film has an intermediate carrier which is provided on both sides with an acrylate adhesive coating.

Furthermore, the idea of the invention comprises a combination of an at least two-part hook and an adhesive strip, which can in particular be a strip of a double-sided adhesive film whose bond can be broken by pulling.

The hook can be used particularly advantageously if the adapter plate is molded in such a way that it can be plugged onto a base plate, the base plate being adhesively bonded to the wall by the adhesive strip. For example, these base plates can be obtained on the market, inter alia, as adhesive hooks with a modular construction (tesa Power Strips system hooks), comprising a base plate onto which a hook body is adapted.

Via these base plates, moldings of an extremely wide range of shapes can be adapted, which permit a large range of variations of applications. Examples include adapters for the fixing of cables, mirrors, pictures, etc.

The base plate comprises a plate whose sides and/or front side, if appropriate, have means for fixing to the adapter plate and whose rear side is adhesively bonded to the sub-base with a strip of a preferably double-sided adhesive film in such a way that one end of the adhesive film projects beyond the plate as a tab, the adhesive film being one such that the adhesive bond achieved with it can be detached again by a pulling action which stretches the strip. At its end or its rear side, at least in the region in which the tab of the adhesive film strip rests, the plate preferably has low adhesive and sliding friction with respect to the adhesive film strip.

It is further preferred if the region which rests on the tab has a low-energy surface, specifically one based on fluorine-containing polymers, organic silicon polymers, polyolefins or based on polymers which contain fluorine-containing segments, segments of organic silicon polymers or polyolefin segments or those based on a mixture of the aforementioned polymers, possibly with further polymers.

It is further preferred if the region on which the tab rests exhibits a surface tension of up to 37 mN/m.

It is further preferred if the region on which the tab rests is formed together with the plate as an integrated plastic injection molded part.

It is further preferred if, on its rear side, at the sides, top and/or bottom, in addition to the adhesively bonded film strip, the plate has spacers whose height is lower than the thickness of the adhesive film strip.

It is further preferred if the spacers are located on both sides, in addition to the bonded adhesive film strip.

It is further preferred if the spacers are formed as webs or segments.

It is further preferred if the spacers are formed as an injection molded part, together with the plate.

It is further preferred if the spacers make up 30 to 90% of the thickness of the bonded adhesive film strip, given a thickness of the adhesive film strip of 0.65 mm, in particular 0.3 to 0.6 mm.

The height of the spacers is advantageously selected such that said height is lower than the thickness of the adhesive film (unstretched), so that satisfactory adhesive bonding to the adhesive background is possible. As a result of the extension of the adhesive film occurring during the detachment operation, the latter is correspondingly reduced in width and thickness. If the thickness of the adhesive film that is achieved during detachment is less than the height of the spacers, then it is possible for the adhesive film to be detached without tearing even if, at the same time, high contact forces occur vertically in relation to the adhesive bond, which would otherwise have led to the adhesive tape tearing.

By using plates which, on the tab side in the edge region of the adhesive bond, contain a material which exhibits the lowest possible adhesion coefficient and a low sliding friction coefficient with respect to the adhesive film respectively used, residue-free detachment of the adhesive bond is possible even when the angle between the bonding plane and the pull-off direction is considerably greater than 0°, in particular about 45° to 135°, in particular 60° to 100°.

With the aid of the hook according to the invention, the disadvantages known from the prior art can be avoided extremely well.

Since the hook is in at least two parts, the cover can simply be replaced in order to change the visual impression of the hook. Replacement of the adhesive strip located under the adapter plate is not necessary. In the production of the hook, it is then merely necessary for the tool for the cover to be made again if the visual appearance of the hook is to be changed.

In the following text, a hook according to the invention and configured in a particularly advantageous way is to be presented in more detail by using a number of figures, without thereby wishing to restrict the invention unnecessarily.

BRIEF DESCRIPTION OF THE DRAWINGS

FIG. 1 shows the at least two-part hook 1 according to the invention. The hook 1 is composed of an adapter plate 10 which, for adhesive bonding with a strip of double-sided adhesive tape whose bond can be broken by being pulled, is formed in such a way that a tab 32 of the adhesive strip 30 projects beyond the adapter plate 10, and a hook body 12 which is located on the adapter plate 10 and which is placed on the adapter plate 10. Plugged on to the adapter plate 10 is a cover 20, which projects over the adapter plate 10 at all the edges, so that of the adapter plate 10, only the hook body 12 can be seen.

Figure 1:
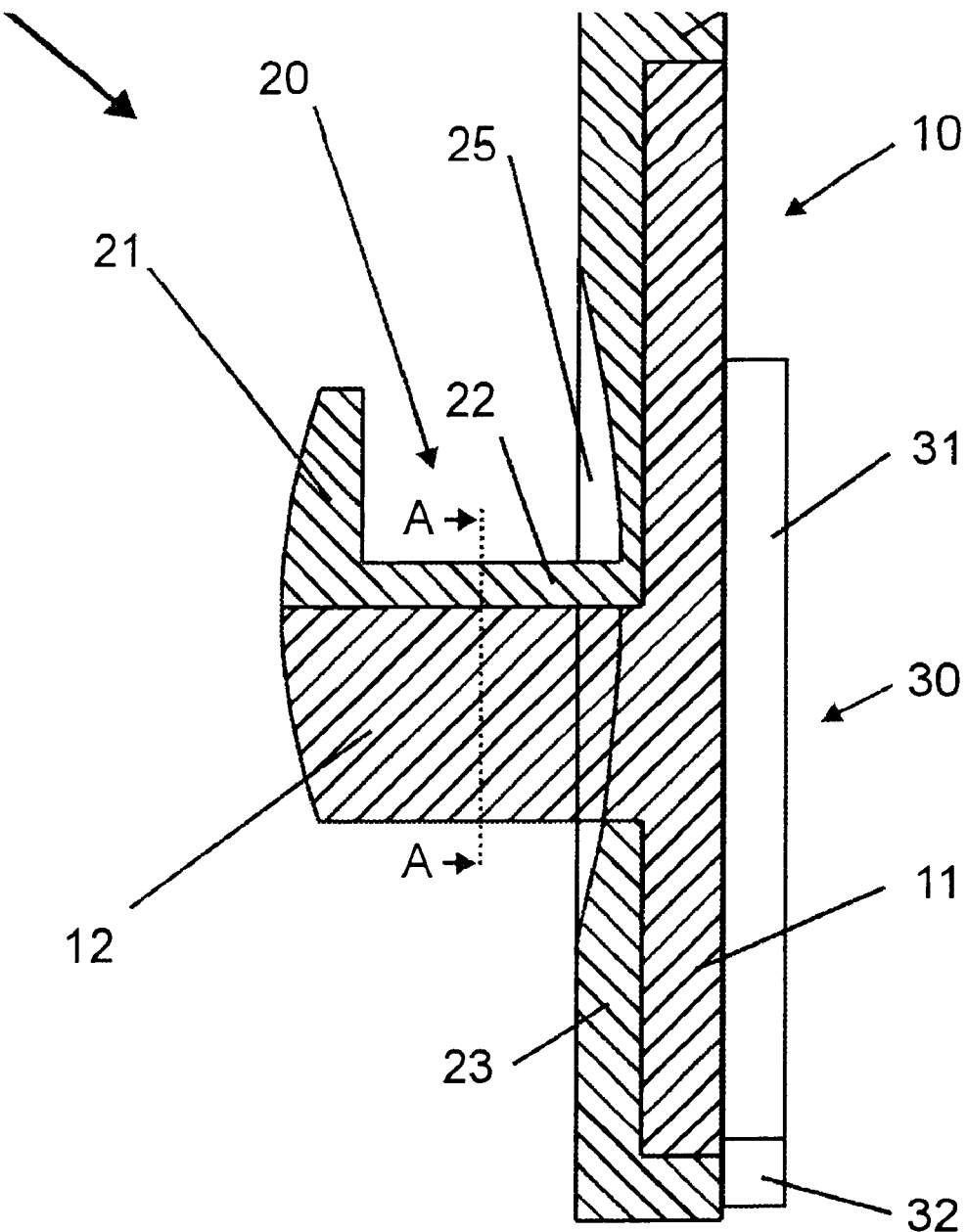
FIG. 1 shows an embodiment of the hook, comprising hook body and adapter plate, in a side view.

The adapter plate 10 comprises a base plate 11, which is substantially rectangular in shape. The hook body 12 is integrally molded on the base plate 11 at the center. The hook body 12 is molded semi-cylindrically.

The cover 20 likewise substantially comprises a rectangularly shaped plate 23, there being on the plate 23, in the marginal area, a collar 24 which extends beyond the entire marginal area of the plate 23. The collar 24 engages around the adapter plate 10.

In addition, there is a second hook body 22 on the cover 20, which in particular supplements the hook body 12 on the adapter plate 10 to form a single hook. The hook bodies 12, 22 in this case rest against each other with a form fit. Integrally molded on the second hook 22 is a nose 21, which extends vertically upward. The nose 21 offers structural resistance to sliding off when things are hung on the hook 1. In the cover 20, there is a plate-like depression 25 around the hook bodies 12, 22.

The cover 20 is plugged onto the adapter plate 10 and therefore covers the entire adapter plate 10 and, in addition, the tab 32 of the adhesive strip 30.

The adhesive strip 30 bonded behind the adapter plate 10 comprises a double-sided adhesive film 31, on which there is a tab 32. The tab 32 of the adhesive strip 30 is used to extend the latter in the longitudinal direction as a result of pulling on the tab 32, so that the adhesive force of the strip 30 is reduced, which detaches the bond between the hook 1 and the wall without any residue. The hook 1 is available for repeated adhesive bonding.

The hook 1 is fitted to a wall, by the adapter plate 10 being fixed to said wall by means of the adhesive strip 30. With the adapter plate 20, the basic framework of the hook 1 is present. The cover 20 can be chosen purely in accordance with visual points of view.

If the appearance of the hook is to be altered, the cover 20 is simply replaced by one which corresponds to the new requirements, without the adhesive bond between the hook 1 and the wall having to be detached.

As long as the location at which the hook 1 is fixed is not to be changed, replacement of the cover 20 is always sufficient to give rise to a changed hook 1.

Figure 2:
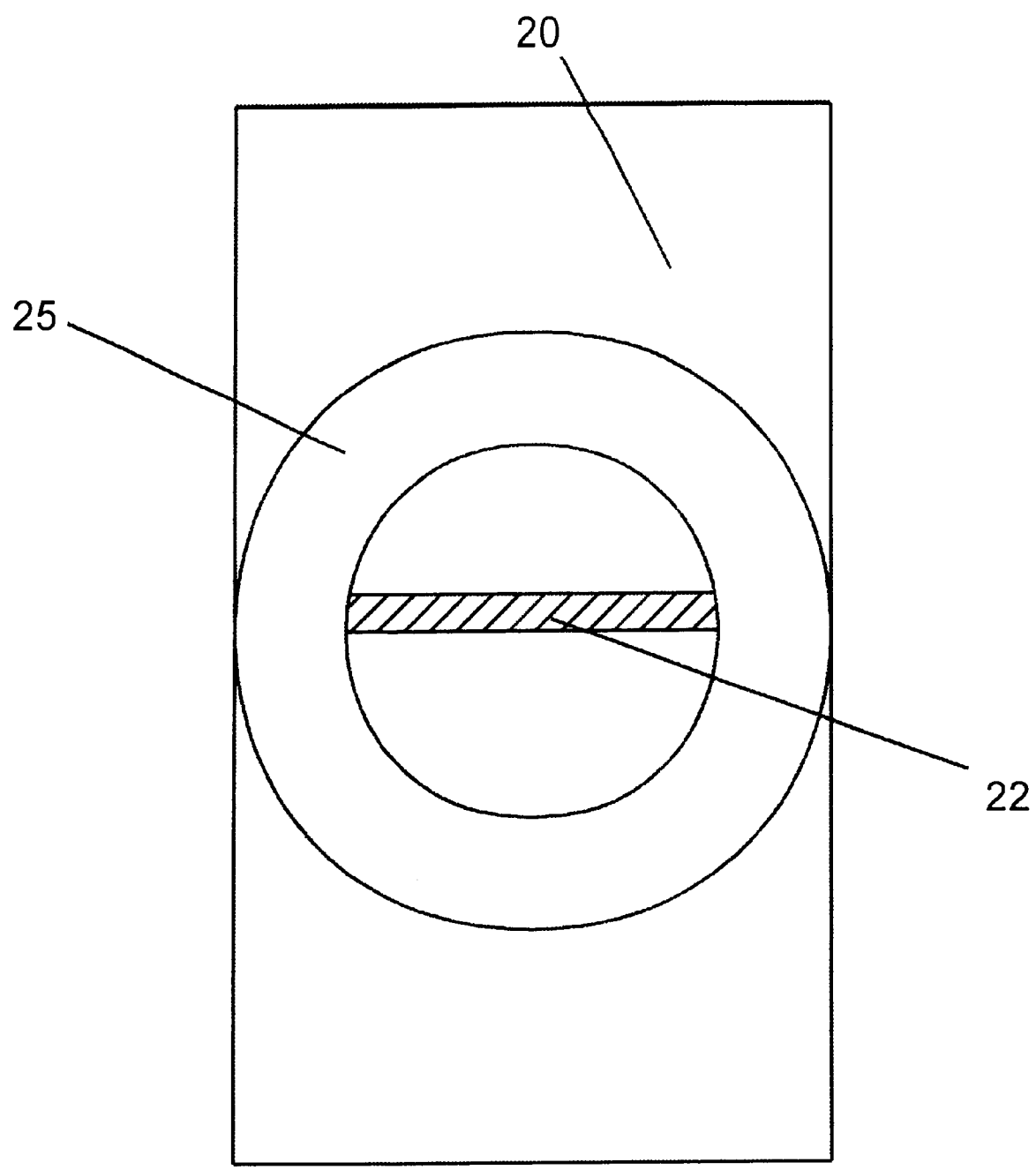
FIG. 2 shows the cover of the hook according to FIG. 1 in lateral section, specifically along the line A—A.

In FIG. 2, the cover 20 is finally shown in lateral section, to be specific along the line A—A. The plate-like depression 25 extends over the entire width of the cover 20.

Figure 3:
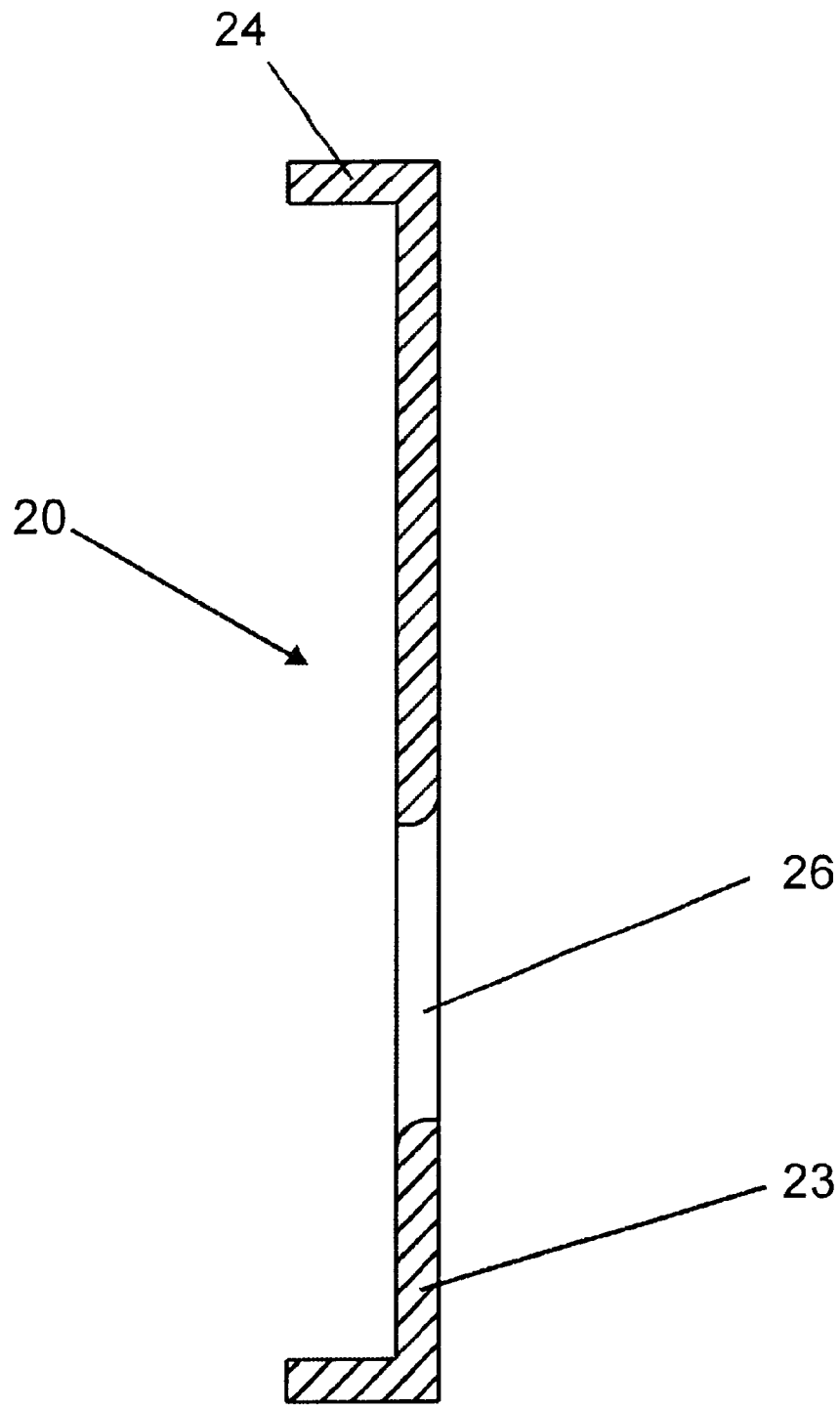
FIG. 3 and FIG. 4 show the adapter plate and the cover of an alternative embodiment of the hook, in lateral section.
Figure 4:
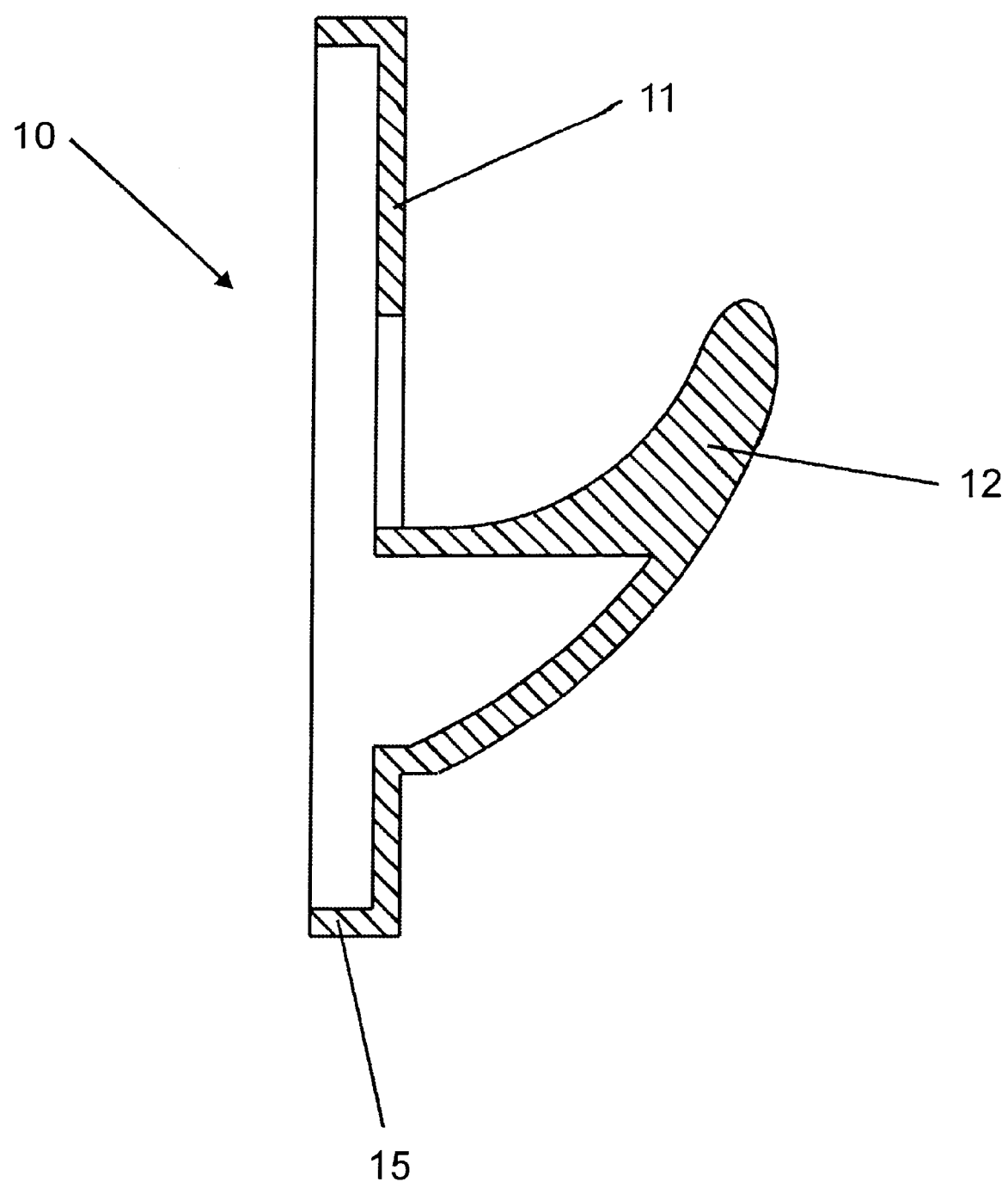

FIGS. 3 and 4 show the adapter plate 10 and the cover 20 of an alternative embodiment of the hook 1 in lateral section. The cover 20 comprises a rectangular plate 23, in which there is a substantially rectangular cutout 26 at the center. The cover 20 does not have a second hook body 22.

The cover 20 is plugged onto the adapter plate 10 by the hook body 12 of the adapter plate 10 being led through the cutout 26 until the cover 20 is resting on the adapter plate 10, so that the collar 24 again encloses the adapter plate 10 completely.

The adapter plate 10 has a frame 15.

Figure 5:
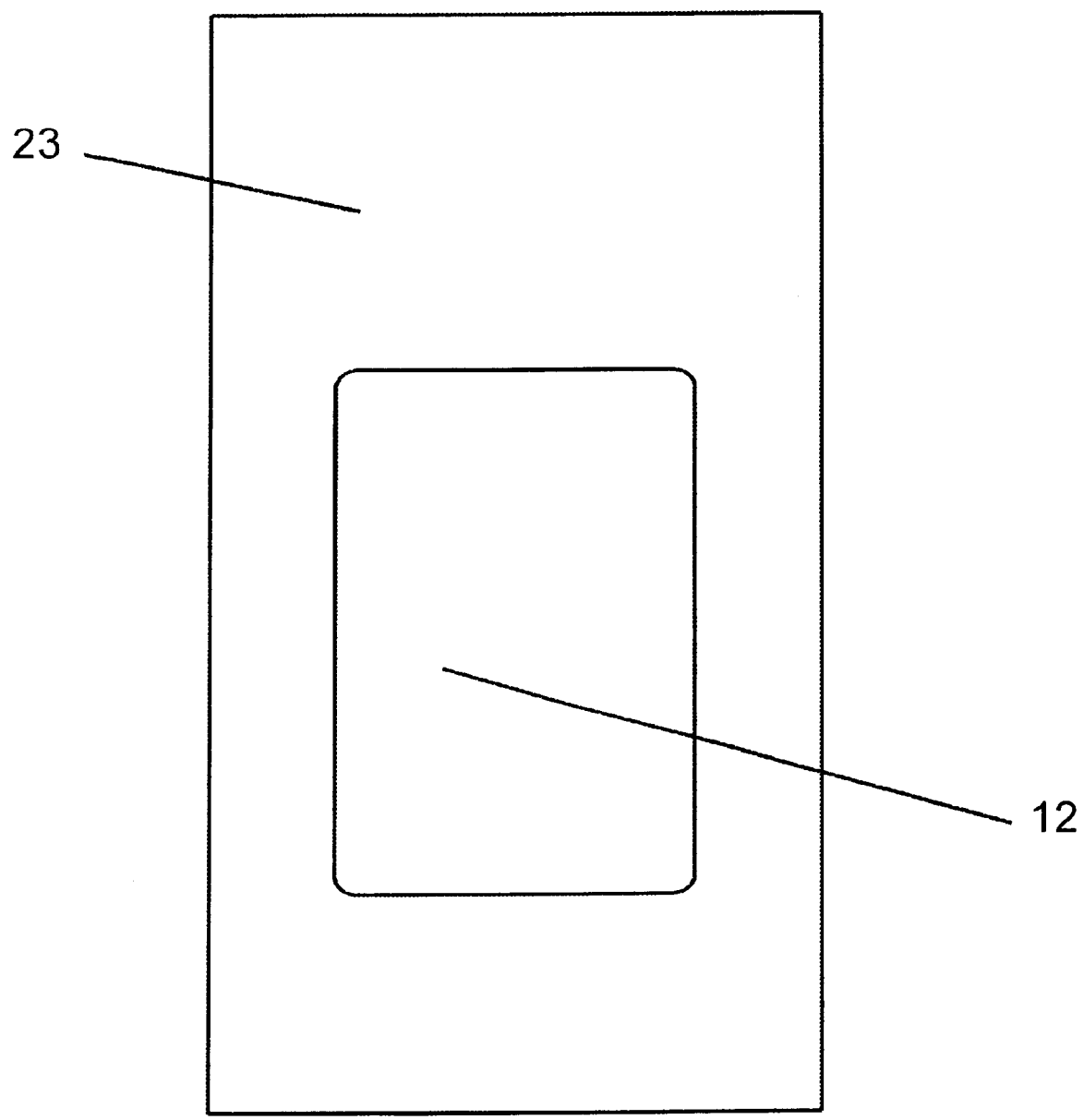
FIG. 5 shows a front view of the adapter plate present underneath the cover from FIG. 4, FIG. 6 and FIG. 7 show the adapter plate and the cover of a further alternative embodiment of the hook, in lateral section.

FIG. 5 shows a front view of the adapter plate 10 present underneath the cover 20.

Figure 6:
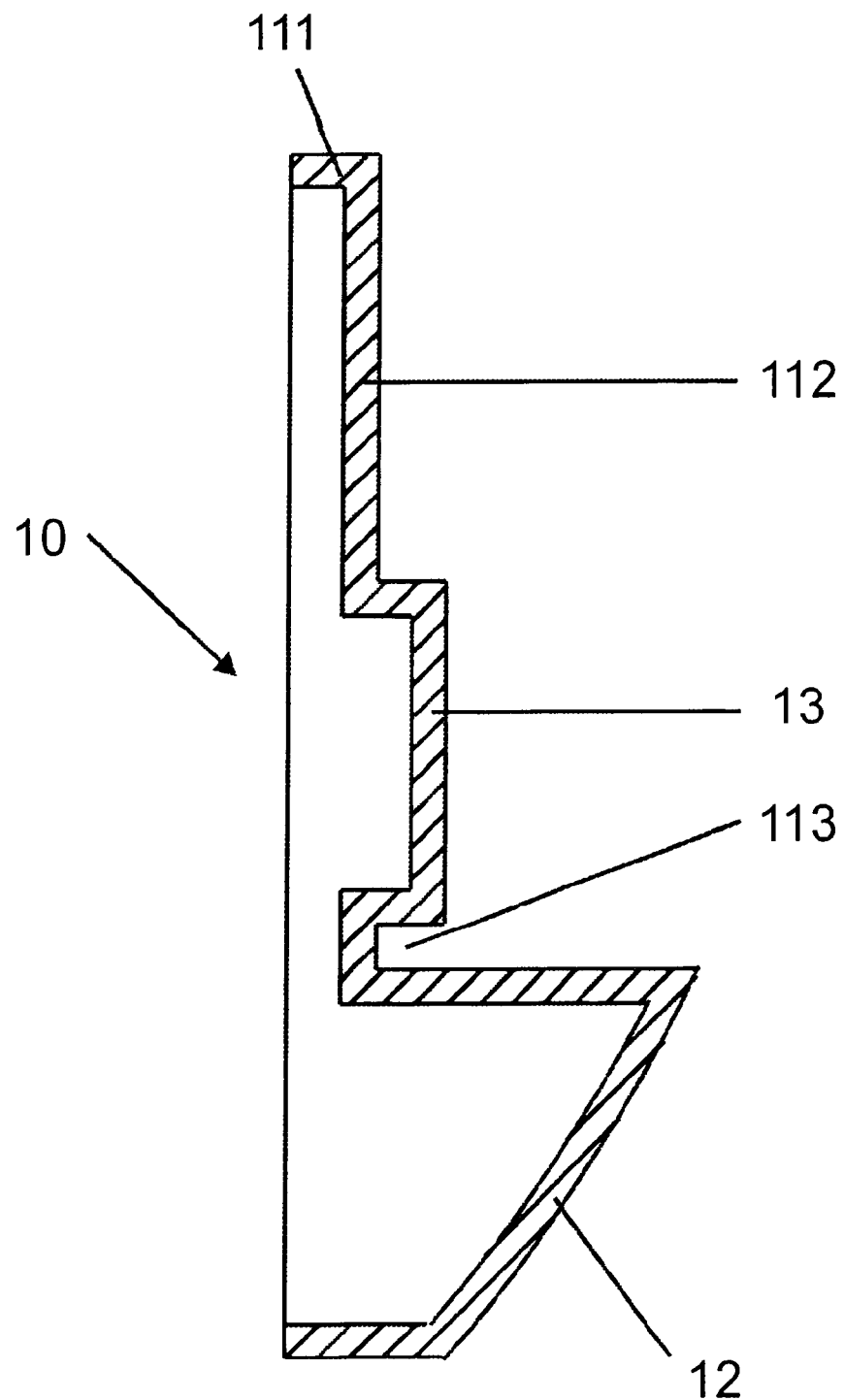
Figure 7:
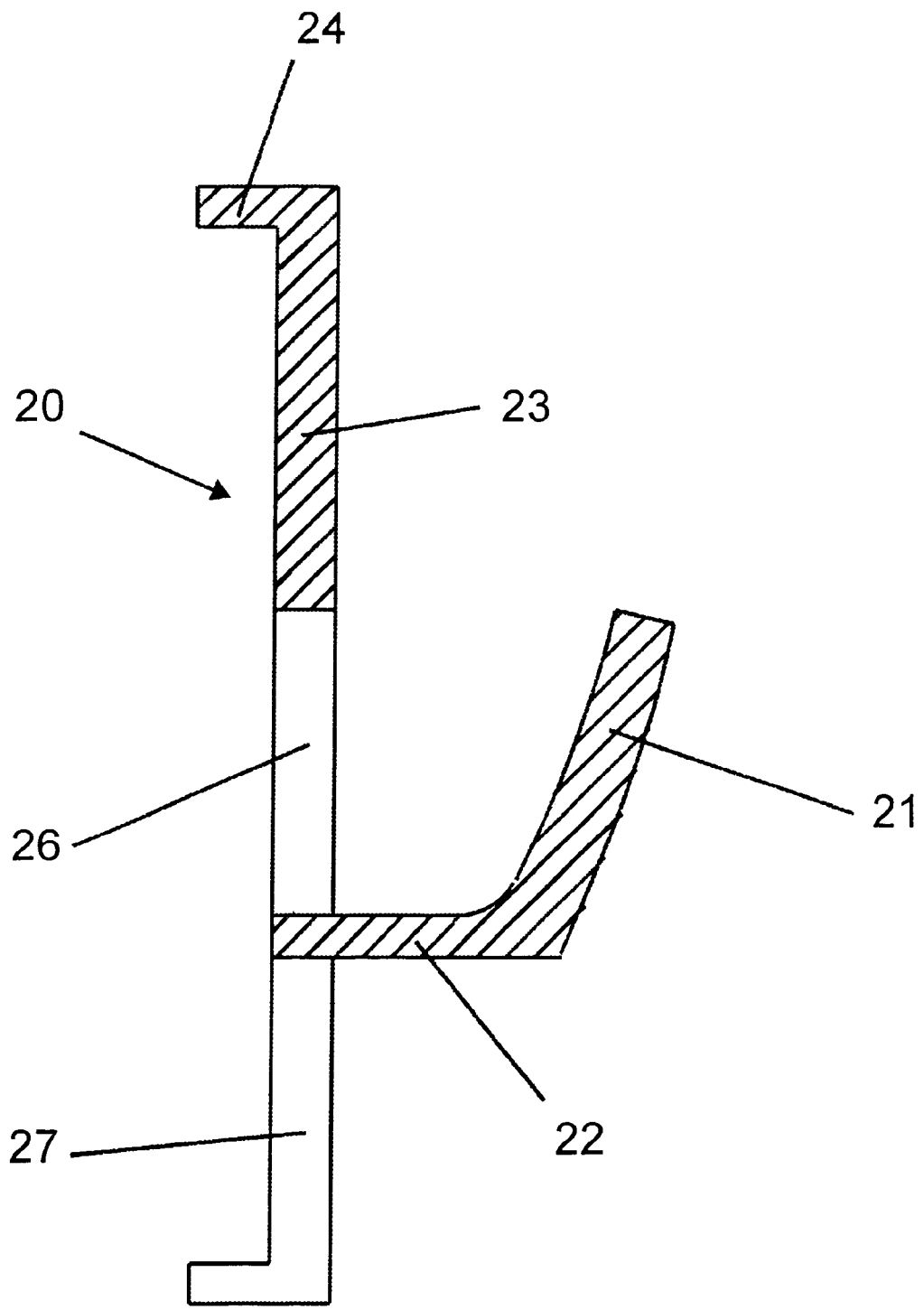

FIGS. 6 and 7 show the adapter plate 10 and the cover 20 of a further alternative embodiment of the hook 1 in lateral section.

The cover 20 again comprises a rectangular plate 23, in which there is a substantially rectangular cutout 26 at the center. Underneath the cutout 26 there is a second hook body 22, on which a nose 21 is integrally molded, extending upward in a slightly curved shape.

Underneath the hook body 22 there is a second cutout 27, which has the same width as that of the first cutout 26.

The second cutout 27 is used to accommodate the hook body 12 on the adapter plate 10, and the first cutout 26 to accommodate a protrusion 13 on the adapter plate 10.

The adapter plate 10 is designed to be hollow on the inside. The adapter plate 10 comprises a rectangular frame 111, which is closed by a cover 112. On the cover 112 there is a rectangular protrusion 13, which engages with a form fit in the cover 20 and therefore secures the cover 20 on the adapter plate 10. This effect is reinforced by a gap 113 between protrusion 13 and hook body 12, in which the second hook body 22 is clamped. Finally, the hook body 12 has a rectangular cross section and ends in the frame 111.

Figure 8:
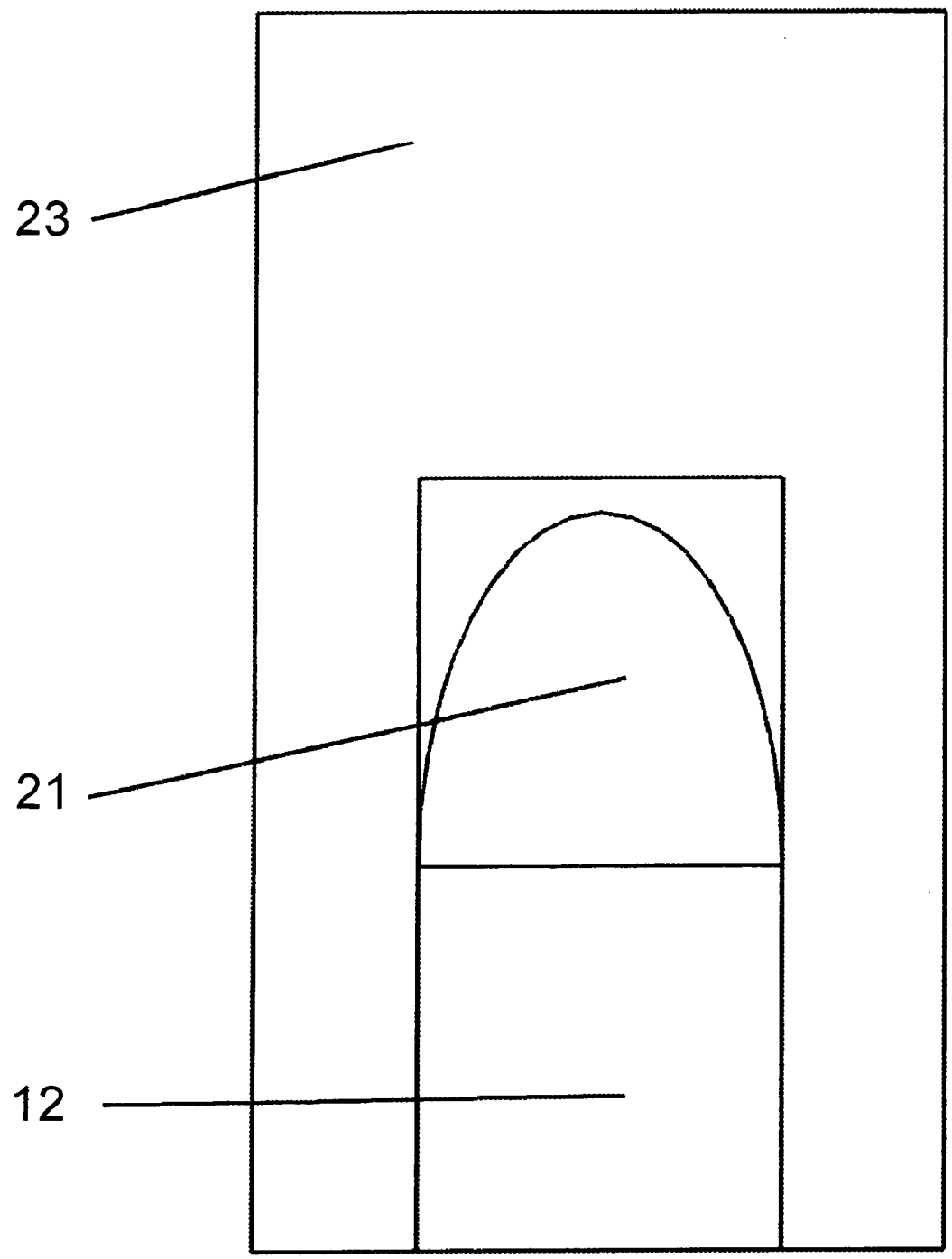
FIG. 8 and FIG. 9 show two possible embodiments of the hook according to FIGS. 6 and 7.
Figure 9:
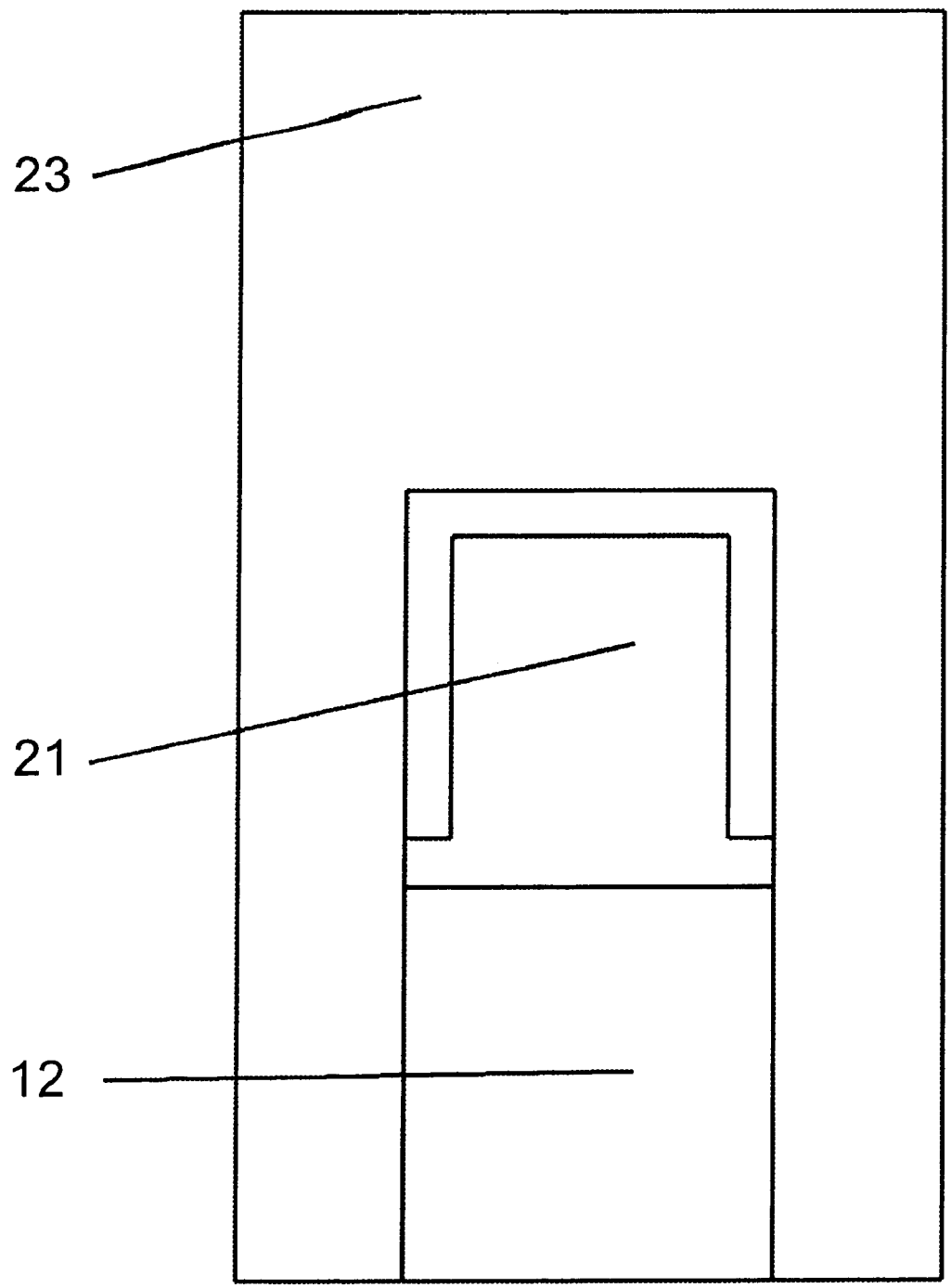

FIG. 8 and FIG. 9 show two possible embodiments of the hook according to FIGS. 6 and 7.

Figure 10:
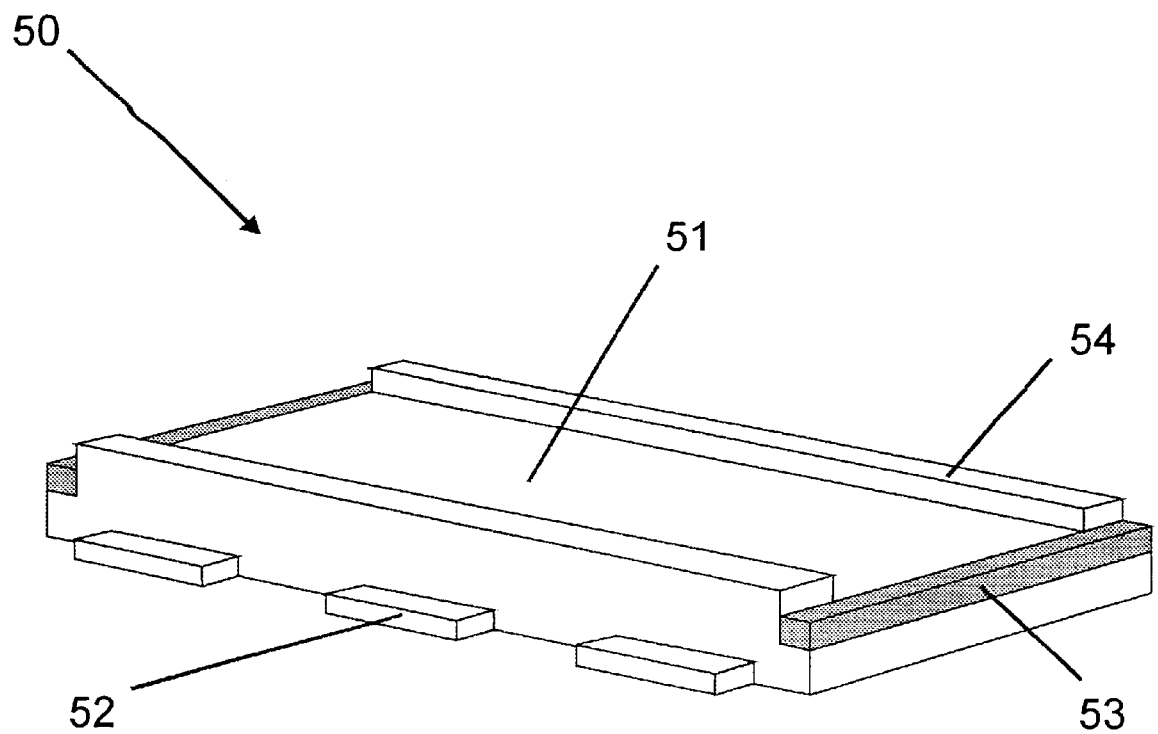
FIG. 10 shows a base plate, which is located between wall and adapter plate.

FIG. 10 shows a particularly advantageously configured base plate 50. Arranged laterally on the latter are latching devices 52, which can latch into corresponding latching devices belonging to the adapter plate. The rear side 51 of the base plate 50 is used for the adhesive bonding of the adhesive film strip.

On the rear side 51 of the base plate 50 there are two areas 53, the tab of the adhesive film strip resting on one of these. The areas 53 consist of a material of low adhesive and sliding friction with respect to numerous adhesive compounds, here of high-density polyethylene. Since the user is able to bond the base plate 50 with the adhesive film strip in such a way that the tab can project both at one end and at the other end, the two areas 52 are equipped in such a way that these areas have a low adhesive and sliding friction or adhesion in relation to the adhesive films used.

In addition, however, on both sides of the rear side 51, the base plate 50 has spacers 56, formed as webs, whose height is about half the thickness of the adhesive film strip to be applied, the spacing of the spacers 56 being selected such that the adhesive film strip can easily be placed with its width between them.

What is claimed is:

1. An at least two-part hook, comprising an adapter plate having a first side and a second side, the first side of which is provided with a hook body, and having a double-sided adhesive film, the bond of which can be broken by stretching, on said second side, said double-sided adhesive film having a tab which projects beyond said adapter plate, and a cover which is plugged onto and covers at least a portion of said adapter plate, and is provided with a second hook body which optionally supplements the hook body of said adapter plate.

2. The at least two-part hook as claimed in claim 1, wherein the cover covers the entire adapter plate, the tab of the adhesive strip, or both.

3. The at least two-part hook as claimed in claim 1, wherein the adapter plate, the cover, or both, are produced from glass, metal or plastic.

4. The at least two-part hook of claim 3, where said adapter plate, cover or both are plastic, and said plastic is selected from the group consisting of polyethylene terephthalate, polystyrene, or ABS.

5. The at least two-part hook as claimed in claim 1, wherein the adapter plate, the cover, or both are transparent.

6. An at least two-part hook, comprising an adapter plate which is provided with a hook body, a cover which is plugged onto and covers at least a portion of said adapter plate, and is provided with a second hook body which optionally supplements the hook body of said adapter plate to form a single hook, and a base plate onto which the adapter plate is plugged, said base plate having a double-sided adhesive film, the bond of which can be broken by being pulled, said double-sided adhesive film having a tab which projects beyond said base plate.

* * * * *